US011303221B1

(12) United States Patent
Veeraraghavan et al.

(10) Patent No.: US 11,303,221 B1
(45) Date of Patent: Apr. 12, 2022

(54) DC-AC INVERTER DRIVE SYSTEM AND OPERATION

(71) Applicant: Kripya LLC, Vancouver, WA (US)

(72) Inventors: Vilakkudi G. Veeraraghavan, Sammamish, WA (US); Ramarao Ananathakrishnan, Coimbatore (IN); Murali Thangaraj, Chennai (IN); Asif Ismail, Chennai (IN)

(73) Assignee: Kripya LLC, Vancouver, WA (US)

( * ) Notice: Subject to any disclaimer, the term of this patent is extended or adjusted under 35 U.S.C. 154(b) by 14 days.

(21) Appl. No.: 17/033,060

(22) Filed: Sep. 25, 2020

(51) Int. Cl.
*H02M 7/493* (2007.01)
*H02M 1/08* (2006.01)
*H02M 7/5395* (2006.01)
*H02J 3/38* (2006.01)
*H02J 3/32* (2006.01)

(52) U.S. Cl.
CPC .......... *H02M 7/493* (2013.01); *H02M 1/083* (2013.01); *H02M 7/5395* (2013.01); *H02J 3/32* (2013.01); *H02J 3/381* (2013.01); *H02J 2300/24* (2020.01); *H02J 2300/28* (2020.01)

(58) Field of Classification Search
CPC .... H02M 7/493; H02M 1/083; H02M 7/5395; H02M 1/08; H02J 2300/28; H02J 2300/24; H02J 3/32; H02J 3/381; H02J 3/38
See application file for complete search history.

(56) References Cited

U.S. PATENT DOCUMENTS

2012/0313443 A1* 12/2012 Cheng ....................... H02J 3/46
307/82

* cited by examiner

*Primary Examiner* — Robert L Deberadinis
(74) *Attorney, Agent, or Firm* — Lee & Hayes, P.C.

(57) ABSTRACT

Disclosed is a drive system and its operation for multiple DC-AC inverters working in parallel, for applications such as off-grid solar energy harvesting, which enables a stable operation under various load conditions. The disclosed drive system offers voltage and frequency synchronized sine wave output from each of the inverters, enabling stable operation of the entire system under differing load conditions.

20 Claims, 4 Drawing Sheets

DC-AC INVERTER DRIVE SYSTEM AND OPERATION

FIELD OF THE INVENTION

The present invention relates to systems and methods of operation of direct current-to-alternating current (DC-AC) inverters operating as an interconnected array for applications such as solar energy harvesting in off-grid mode.

BACKGROUND

Modular DC-AC inverters are becoming very popular for applications in solar energy harvesting due to several advantages such as modularity, safety, and lower sensitivity to shading and single module failure, as compared to traditional central inverters. The majority of the inverters are used in the grid connected mode where the reference voltage and frequency are provided by the grid. In addition, the grid acts as a sink for excess power generated by the inverters over and above the local load demand, and as a source for additional power when the power generated by the inverters is less than the local load demand. This enables a stable operation of the inverters in the grid connected mode of operation. However, there is a significant need for inverters operating reliably in the off-grid mode in several applications where access to grid power is not always available and even when available not very reliable. Conventional methods of paralleling output of multiple inverters to support a load do not provide a solution that is stable under varying load conditions. In most of these cases synchronization of output voltage, frequency and phase angle are very difficult, and the output voltage becomes unstable under varying load conditions.

The present disclosure is targeted to address these limitations of operating DC-AC inverters in the off-grid mode and to enable a well-synchronized, stable output voltage to support varying load conditions.

SUMMARY

Described herein is a drive system and its operating methods for an array of DC-AC inverters operating in off-grid mode of operation wherein the alternating current (AC) output of the inverters are connected in parallel. One of the DC-AC inverters in the array is configured as a control unit and the remaining DC-AC inverters in the array are configured as follower units. The control unit computes the duty cycle for the pulse-width modulation (PWM) drive signals at the switching frequency of the DC-AC converter based on the input direct current (DC) voltage and the required output AC characteristics such as, without limitation, voltage, wave form and frequency. The PWM drive signal duty cycles are adjusted (e.g., constantly) based on the voltage feedback signals from an AC bus. The PWM drive signals are used for generating the required AC output waveform in the control unit. In addition, a reference PWM signal along with a PWM synchronization signal and zero cross synchronization signal from the control unit are transmitted to the follower units via a communication port of the control unit.

The follower units receive the reference PWM drive signal along with the PWM synchronization signal and the zero crossing synchronization signal via respective communication ports of the follower units. Reference PWM signal duty cycles are determined by the follower units via respective electronic capture modules of the follower units. Respective PWM modules in the follower units replicate the PWM drive signals based on the determined duty cycle, and the PWM drive signals are used for generating respective AC output waveforms in the follower units.

The synchronization signals (e.g., the PWM synchronization signal and the zero crossing synchronization signal) received by the follower units from the control unit are used to ensure synchronization of the AC output waveforms of the follower units with the AC output waveform of the control unit.

The use of common PWM drive and synchronization signals across all the inverters ensures the stability of the AC output waveform for the array of inverters connected in parallel under varying load conditions.

This summary is provided to introduce a selection of concepts in a simplified form described below in the detailed description. This summary is not intended to identify key features or essential features of the claimed subject matter, nor is it intended to be used to limit the scope of claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical components or features.

DETAILED DESCRIPTION

In the following detailed description of embodiments, specific detailed examples are given to provide an understanding of the embodiments. However, it is to be appreciated that the embodiments may be practiced without these specific details. Furthermore, the techniques and systems disclosed herein are limited to the described embodiments. Numerous modifications, changes, variation, substitutions, and equivalents will be apparent to those skilled in the art.

Figure 1:
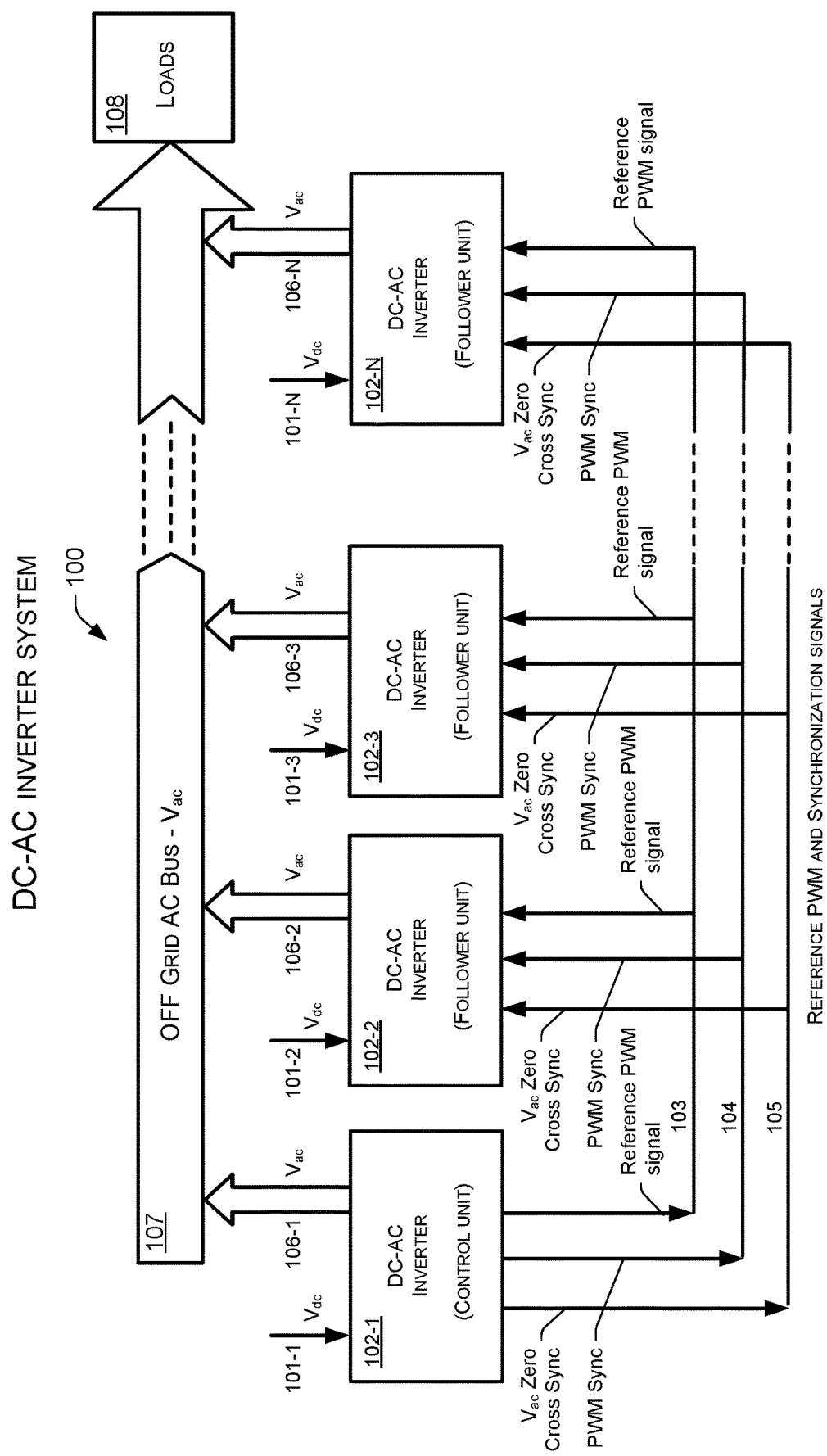
FIG. 1 is a schematic block diagram of an example DC-AC inverter system with multiple DC sources and associated DC-AC inverters working in off-grid mode of operation along with reference PWM and synchronization signals.

FIG. 1 is a schematic block diagram of an example DC-AC inverter system 100 with multiple DC input sources 101-1, 101-2, 101-3, . . . 101-N, and associated DC-AC inverters 102-1, 102-2, 102-3, . . . 102-N (sometimes referred to herein as "inverters 102") working in off-grid mode of operation. In this system the inverter 102-1 is configured as the control unit and the remaining inverters 102-2, 102-3, . . . 102-N are configured as follower units. Also presented are the reference PWM signal 103, PWM synchronization (sync.) signal 104 and $V_{ac}$ zero crossing signal 105. The $V_{ac}$ output 106-1, 106-2, 106-3, . . . 106-N represent the output from each of the inverters 102-1, 102-2, 102-3, . . . 102-N respectively which are connected to off-grid AC bus 107. The off-grid AC bus 107 is connected to the loads 108.

As an illustrative example, the DC-AC inverter system 100 may be a 3000 Watt roof top solar energy system operating in off-grid mode with ten 300 Watt solar panels as DC input sources (101-1, 101-2, 101-3, . . . 101-10) connected to ten inverters (102-1, 102-2, 102-3, . . . 102-10), each inverter 102 of a 300 watt capacity. The inverter 102-1 is configured as the control unit and the inverters 102-2, 102-3, . . . 102-10 are configured as follower units. The reference PWM signal 103 generated in the control unit 102-1 is shared with (e.g., sent to, transmitted to, communicated to, etc.) the follower units 102-2, 102-3, . . . 102-10 for replication and for driving the DC-AC converters in these follower units. The AC output 106-1, 106-2, 106-3, . . . 106-10 are connected to the off-grid AC bus 107 which supplies the energy to the load 108.

While in the above illustrative example the DC input sources 101-1, 101-2, 101-3, . . . 101-N are identified as solar panels, the techniques and systems described herein are equally applicable to different types of DC input source connected to the inverters. Some specific examples of possible DC input sources are (i) a photovoltaic solar panel, (ii) a fuel cell, (iii) a battery, (iv) a wind energy generator, or (v) an ultracapacitor.

It is to be noted that while in the above example inverter 102-1 is configured as the control unit, in practice, any one of the inverters (102-1, 102-2, 102-3, . . . 102-N) can be configured as a control unit and the remaining inverters configured as follower units. Also, the reconfiguration of a control unit into a follower unit and a follower unit into a control unit is possible.

The inverters (102-1, 102-2, 102-3, . . . 102-N) employ at least one of (i) one or more high frequency transformers, or (ii) one or more high frequency inductors; and operate in at least one of (i) a single-stage DC-AC conversion mode, or (ii) a two-stage DC-DC-AC conversion mode.

Also to be noted is that the inverter(s) (102-1, 102-2, 102-3, . . . 102-N) is/are one of: (i) a microinverter(s), (ii) a modular inverter(s), or (iii) a string inverter(s) with specifications of an (i) off-grid inverter, (ii) hybrid inverter, or (iii) dual mode inverter operating in off-grid mode of operation Also to be noted is that the inverters (102-1, 102-2, 102-3, . . . 102-N) can be of the same or different power ratings as long as they share a common switching frequency.

For the purpose of operating and controlling the inverters (102-1, 102-2, 102-3, . . . 102-N), the DC-AC inverter system 100 is equipped with one or more sensors and one or more fault protection features such as: a input DC voltage high and low limits sensor(s), an AC output voltage sensor(s), an output current limit sensor(s) and/or a temperature sensor(s).

Figure 2:
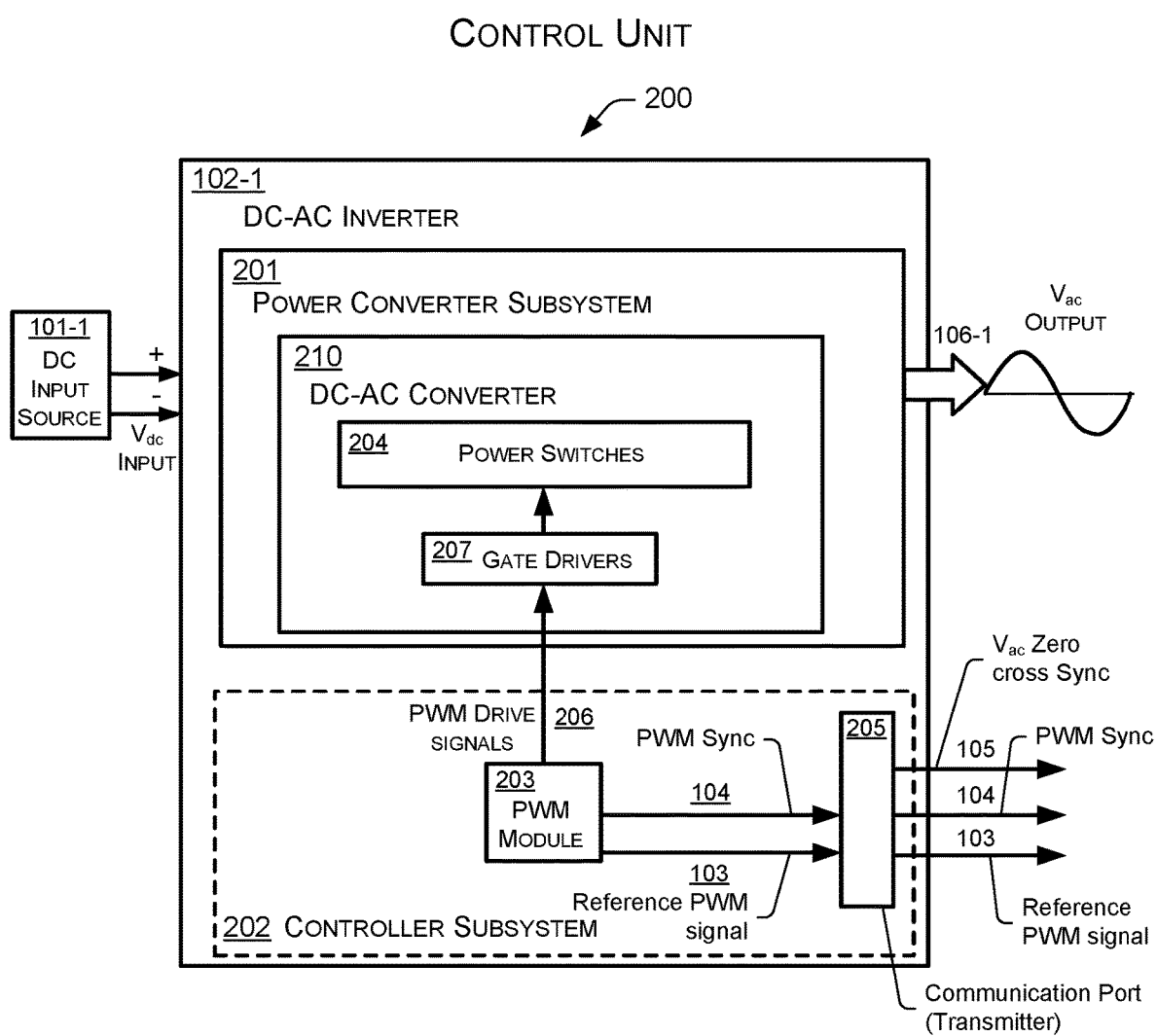
FIG. 2 is a schematic block diagram of an example DC-AC inverter configured as a control unit illustrating the power converter subsystem and controller subsystem. Also noted is a communication port(s) configured as the transmitter of the reference PWM and synchronization signals.

FIG. 2 is a schematic block diagram of an example DC-AC inverter 102-1 configured as a control unit 200 illustrating the power converter subsystem 201 and controller subsystem 202 of the control unit 200. Controller subsystem 202 has a PWM module 203 for generating the reference PWM signal 103 (sometimes referred to herein as a "reference PWM signal 103") and additional PWM drive signals 206 for driving power switches 204 through gate drivers 207 in the DC-AC converter 210. Also noted is a communication port(s) 205 configured as the transmitter of the reference PWM signal 103, PWM sync. signal 104, and $V_{ac}$ zero crossing signal 105 (sometimes referred to herein as a "zero crossing signal 105" or "zero crossing synchronization signal 105").

As an illustrative example, the PWM module 203 in the control unit 200 initially generates reference PWM signal 103 and additional PWM drive signals 206 at the switching frequency (for example 56 kilohertz (KHz)) of the power converter subsystem 201 whose duty cycles are computed based on the input DC voltage $V_{dc}$ 101-1 (for example 36 Volts (V)) and required output AC characteristics such as, without limitation, voltage (for example 220 V), wave form (for example sine wave) and frequency (for example 50 hertz (Hz)). Once initiated, the duty cycle of the reference PWM signal 203 and PWM drive signals 206 are dynamically controlled by the closed loop feedback of the AC bus 107 voltage to maintain the AC bus 107 voltage $V_{ac}$ within specified limits (for example between 210 and 230 V).

Figure 3:
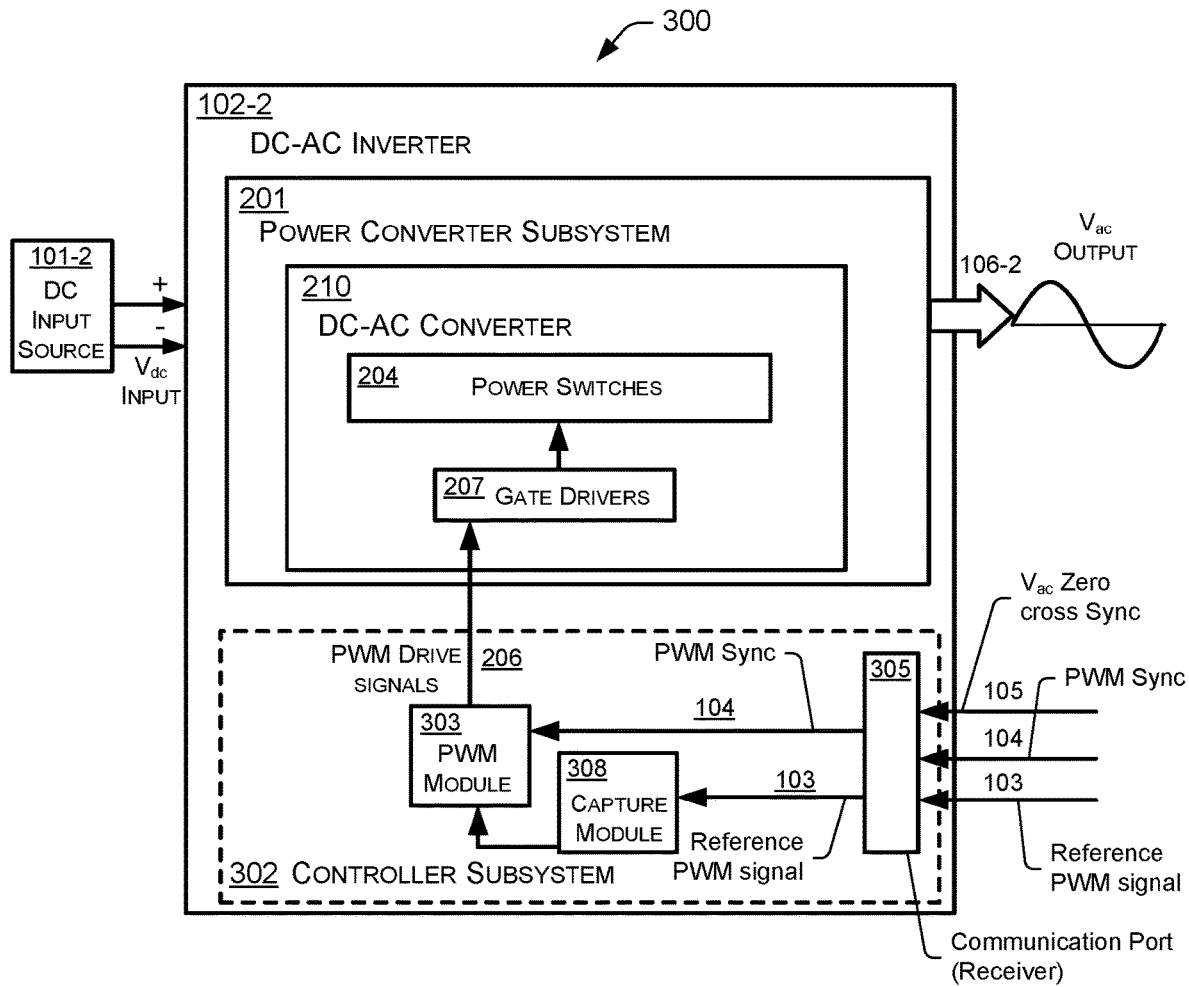
FIG. 3 is a schematic block diagram of an example DC-AC inverter configured as a follower unit illustrating the power converter subsystem and controller subsystem. Also noted is a communication port(s) configured as the receiver of the reference PWM and synchronization signals.

FIG. 3 is a schematic block diagram of an example DC-AC inverter 102-2 configured as a follower unit 300 illustrating the power converter subsystem 201 and controller subsystem 302 of the follower unit. Also noted is a communication port(s) 305 configured as the receiver of the reference PWM signal 103, PWM sync. signal 104, and $V_{ac}$ zero crossing signal 105 transmitted from the control unit 200.

Controller subsystem 302 has an electronic capture module 308 for determining the duty cycle of the received reference PWM signal 103, and a PWM module 303 for generating the PWM drive signals 206 by replicating the reference PWM signal 103 for driving the power switches 204 through gate drivers 207 in the DC-AC converter 210.

As an illustrative example, the communication port 305 configured as the receiver receives the reference PWM signal 103 at the switching frequency (for example 56 KHz) from the control unit 200. The capture module 308 determines the duty cycle of the reference PWM signals 103. Controller subsystem 302 configures the PWM module 303 for generating the PWM drive signals 206 by replicating the frequency and duty cycle of the reference PWM signal 103 for driving the power switches 204 through gate drivers 207 in the DC-AC converter 210. The power converter subsystem 201 in the follower unit 300 generates output AC voltage of required voltage, frequency, and waveform (for example 220 volts, 50 Hz, and sine wave). PWM sync. signal 104 and $V_{ac}$ zero crossing signal 105 transmitted from the control unit 200 and received by the follower unit 300 are utilized for ensuring the AC output $V_{ac}$106-2 waveform generated by the follower unit 300 is in synchronization with that generated by the control unit 200.

The communication port 205 for the control unit 200 and the communication port 305 for the follower unit 300 can be of wired or wireless type using industry standard or custom protocols.

The controller subsystem 202 for the control unit 200 and the controller subsystem 302 for the follower unit 300 can be of any one of a digital signal processor (DSP), a microcontroller, a Field Programmable Gate Array (FPGA), or an Application Specific Integrated Circuit (ASIC).

Figure 4:
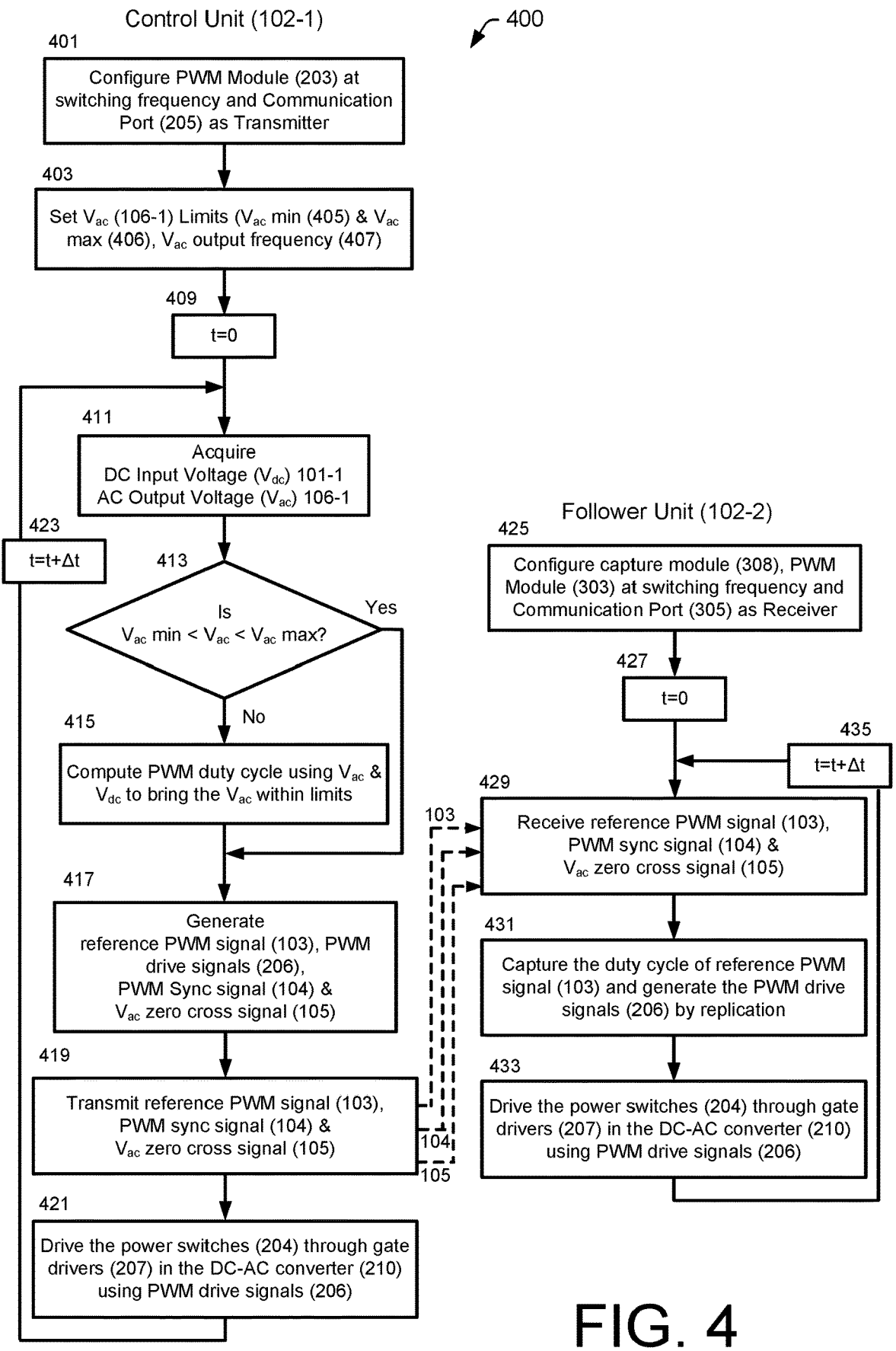
FIG. 4 is a flow diagram of an illustrative process for the operation of a DC-AC inverter system operating in the off-grid mode of operation. Also noted are the process for generating and communicating a reference PWM and synchronization signals from the control unit to the follower unit.

FIG. 4 is a flow diagram of an illustrative process for the operation of a DC-AC inverter system 100 operating in the off-grid mode of operation. The process flow 400 outlines the functions of the control unit 102-1 and the follower unit 102-2. Also noted are the process for generating and communicating a reference PWM signal 103, PWM synchronization signal 104, and $V_{ac}$ zero crossing signal 105 from the control unit 102-1 to the follower unit 102-2. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Moreover, in some embodiments, one or more blocks of the processes may be omitted entirely.

As an illustrative example, the initialization step 401 of the control unit 102-1 involves configuring the PWM module 203 for a switching frequency (for example 56 KHz) of the power converter subsystem 201 and configuring the communication port 205 as a transmitter. The initialization step 425 of the follower unit 102-2 involves configuring the PWM module 303 for a switching frequency (for example 56 KHz) of the power converter subsystem 201 and configuring the communication port 305 as a receiver. The initialization step 425 may further involve configuring the capture module 308 in the controller subsystem 302 of the follower unit 102-2.

The initialization step 403 sets the $V_{ac}$ minimum limit 405, $V_{ac}$ maximum limit 406 and the $V_{ac}$ output frequency 407 for the output voltage $V_{ac}$ (for example 210 V, 230 V and 50 Hz, respectively).

The initialization step 409 sets the start clock time, t=0 for the control unit 102-1 and the initialization steps 427 sets the start clock time, t=0 for the follower unit 102-2.

The process steps 411-423 are associated with control unit 102-1. In process step 411 PWM module 203 acquires the DC input voltage $V_{dc}$ 101-1 and AC output voltage $V_{ac}$ 106-1 from the respective sensors. Process step 413 compares the value of $V_{ac}$ 106-1 with the $V_{ac}$ minimum limit 405 and $V_{ac}$ maximum limit 406 and verifies if the logic $V_{ac}$ minimum limit 405<$V_{ac}$ 106-1<$V_{ac}$ maximum limit 406. If this logic is satisfied, the process step 415 is skipped, and the process step 417 is performed. If the logic is not satisfied, process step 415 is performed where controller subsystem 202 computes, using $V_{dc}$ and $V_{ac}$ values, the duty cycle for the reference PWM signal 103. In process step 417 the PWM module 203 in the controller subsystem 202 generates the reference PWM signal 103, PWM drive signals 206, PWM synchronization signal 104 and $V_{ac}$ zero crossing signal 105. In process step 419 the communication module 205 in the controller subsystem 202 set in the transmit mode transmits the reference PWM signal 103, PWM synchronization signal 104 and $V_{ac}$ zero crossing signal 105 to the follower unit 102-2 communication module 305 set in the receiver mode. In process step 421, the PWM drive signals 206 are used to drive the power switches 204 in the DC-AC converter 210 of the control unit 102-1. This process flow (steps 411-421) is repeated at high frequency (for example 56 KHz) with time interval Δt (for example 17.85 microseconds) as indicated in step 423.

The process steps 429-435 are associated with follower unit 102-2. In process step 429 the communication module 305 in the controller subsystem 302 set in the receiver mode receives the reference PWM signal 103, PWM synchronization signal 104 and $V_{ac}$ zero crossing signal transmitted from the control unit 102-1 communication module 205 set in the transmitter mode. In process step 431, the capture module 308 determines the duty cycle of the reference PWM signal 103. Controller subsystem 302 configures the PWM module 303 for generating the PWM drive signals 206 by replicating the frequency and duty cycle of the reference PWM signal 103. PWM synchronization signal 104 is used to ensure the generated PWM drive signals are in synchronization with the reference PWM signal. In process step 433, the PWM drive signals 206 are used to drive the power switches 204 in the DC-AC converter 210 of the follower unit 102-2. $V_{ac}$ zero crossing signal 105 is used to ensure the AC output from the follower unit 102-2 is in synchronization with the AC output from the control unit 102-1, This process flow (steps 429-433) is repeated at high frequency (for example 56 KHz) with time interval Δt (for example 17.85 microseconds) as indicated in step 435.

The techniques and systems disclosed herein can be implemented in different embodiments of DC-AC inverter systems operating in off-grid mode of operation. For example, the controller subsystem 202 of the control unit 200 can be configured to integrate the functions of PWM drive signal generation and transmission to the follower unit(s) 300 instead of generating and transmitting a reference PWM signal 103 to the follower unit(s) 300. In this embodiment, the follower unit(s) may not include a controller subsystem 302, but may include the power converter subsystem 201. The controller subsystem 202 of the control unit 200 may comprise the PWM module 203 to generate PWM drive signals 206 at the switching frequency of the power converter subsystem 201 for driving the power switches 204 of both the control unit 200 and the follower unit(s) 300. Accordingly, these PWM drive signals 206 may be transmitted via the communication port 205 of the control unit 200 for receipt by the follower unit(s) 300, and the control unit 200 may refrain from transmitting a reference PWM drive signal 103 in this embodiment. The follower unit(s) 300 may receive, via their respective communication port(s) 305, the PWM drive signals 206 from the control unit 200 and may use the PWM drive signals 206 to drive the power switches 204 of the power converter subsystem(s) 201 of the follower unit(s) 300.

We claim:

1. A direct current-to-alternating current (DC-AC) inverter system operating in off-grid mode comprising:
   multiple direct current (DC) sources;
   a first DC-AC inverter coupled to a first DC source of the multiple DC sources and configured to generate a first alternating current (AC) output voltage, wherein the first DC-AC inverter is configured as a control unit for establishing a reference output voltage and a reference output frequency, the first DC-AC inverter comprising:
   a power converter subsystem; and
   a controller subsystem comprising:
      a pulse-width modulation (PWM) module configured to generate a reference PWM signal and PWM drive signals at a switching frequency of the power converter subsystem; and
      a first communication port to transmit a reference PWM signal, a PWM synchronization signal and a zero crossing synchronization signal to a second DC-AC inverter; and
   the second DC-AC inverter coupled to a second DC source of the multiple DC sources and configured to generate a second AC output voltage, wherein the second DC-AC inverter is configured as a follower unit, the second DC-AC inverter comprising a second communication port to receive the reference PWM drive signal and the one or more synchronization signals from the first DC-AC inverter.

2. The DC-AC inverter system of claim 1, wherein the second DC-AC inverter is re-configurable as the control unit, and wherein the first DC-AC inverter is re-configurable as the follower unit.

3. The DC-AC inverter system of claim 1, wherein DC voltage that is input to the first DC-AC inverter from the first DC source and to the second DC-AC inverter from the second DC source is derived from at least one of:
   (i) a photovoltaic solar panel, (ii) a fuel cell, (iii) a battery, (iv) a wind energy generator, or (v) an ultracapacitor.

4. The DC-AC inverter system of claim 1 wherein the first DC-AC inverter and the second DC-AC inverter are of the same switching frequency.

5. The DC-AC inverter system of claim 1, wherein the first DC-AC inverter and the second DC-AC inverter are each one of:
   (i) a microinverter, (ii) a modular inverter, or (iii) a string inverter.

6. The DC-AC inverter system of claim 1, wherein the first DC-AC inverter and the second DC-AC inverter are each one of:
   (i) an off-grid inverter, (ii) a hybrid inverter, or (iii) a dual-mode inverter operating in off-grid mode of operation.

7. The DC-AC inverter system of claim 1, wherein the first DC-AC inverter and the second DC-AC inverter are each configured to:
   employ at least one of (i) one or more high frequency transformers, or (ii) one or more high frequency inductors; and
   operate in at least one of (i) a single-stage DC-AC conversion mode, or (ii) a two-stage DC-DC-AC conversion mode.

8. The DC-AC inverter system of claim 1, wherein at least one of the first DC-AC inverter and/or the second DC-AC inverter further comprises one or more sensors and one or more fault protection features for at least one of:
   input DC voltage high and low limits;
   voltage high and low limits for AC output voltage;
   output current limit; or
   temperature.

9. A method of operating a direct current-to-alternating current (DC-AC) inverter system in off-grid mode, the method comprising:
   coupling multiple direct current (DC) sources to an array of DC-AC inverters configured to generate alternating current (AC) output voltage;
   configuring a first DC-AC inverter in the array as a control unit;
   configuring one or more second DC-AC inverters in the array as one or more follower units;
   establishing a reference output voltage and a reference output frequency by the first DC-AC inverter;
   generating, by a pulse-width modulation (PWM) module in a controller subsystem of the first DC-AC inverter and using a closed-loop control algorithm, a reference PWM signal and first PWM drive signals at a switching frequency of a power converter subsystem of the first DC-AC inverter;
   using the first PWM drive signals for driving first power switches in a first DC-AC converter of the first DC-AC inverter;
   sending the reference PWM signal, a PWM synchronization signal, and a zero crossing synchronization signal through a communication port of the first DC-AC inverter to the one or more second DC-AC inverters;
   receiving, by the one or more second DC-AC inverters, the reference PWM signal, the PWM synchronization signal, and the zero crossing synchronization signal;
   capturing a duty cycle of the reference PWM signal;
   generating second PWM drive signals by replication by one or more second PWM modules of the one or more second DC-AC inverters; and
   using the second PWM drive signals for driving second power switches in one or more second DC-AC converters of the one or more second DC-AC inverters.

10. The method of claim 9, further comprising using a closed-loop control system to maintain the AC output voltage in a predefined voltage range, wherein the predefined voltage range is defined with preset limit values for AC output voltage minimum and AC output voltage maximum.

11. The method of claim 10, wherein the closed-loop control system implements a closed-loop voltage control algorithm or a closed-loop power control algorithm, or a combination thereof to maintain the AC output voltage in the predefined voltage range.

12. The method of claim 9, wherein the communication port is established by industry standard or custom protocol utilizing wired or wireless or combination of both wired and wireless.

13. The method of claim 9, wherein the controller subsystem is part of any one of a digital signal processor (DSP), a microcontroller, a Field Programmable Gate Array (FPGA), or an Application Specific Integrated Circuit (ASIC).

14. The method of claim 9, further comprising:
   measuring, by a capture unit of one or more controller subsystems of the one or more second DC-AC inverters, the duty cycle of the reference PWM signal received from the first DC-AC inverter;
   configuring, by the one or more controller subsystems of the one or more second DC-AC inverters, the one or more second PWM modules of the one or more controller subsystems; and
   generating, by the one or more second PWM modules of the one or more controller subsystems, the second PWM drive signals by replication.

15. The method of claim 9, wherein the one or more second PWM modules of the one or more second DC-AC inverters use the zero crossing synchronization signal and the PWM synchronization signal received via the communication port from the first DC-AC inverter for generating second AC output voltage in synchronization with the AC output voltage of the first DC-AC inverter.

16. The method of claim 9, wherein the configuring of the first DC-AC inverter or the configuring of the one or more second DC-AC inverters is by means of at least one of hardware or software settings.

17. A direct current-to-alternating current (DC-AC) inverter system operating in off-grid mode comprising:
   multiple direct current (DC) sources;
   a first DC-AC inverter coupled to a first DC source of the multiple DC sources and configured to generate a first alternating current (AC) output voltage, wherein the first DC-AC inverter is configured as a control unit for establishing a reference output voltage and a reference output frequency, the first DC-AC inverter comprising:
   a first power converter subsystem comprising first power switches; and a controller subsystem comprising:
- a pulse-width modulation (PWM) module configured to generate PWM drive signals at a switching frequency of the first power converter subsystem for driving the first power switches; and
- a first communication port configured to transmit the PWM drive signals to a second DC-AC inverter in the system; and the second DC-AC inverter coupled to a second DC source of the multiple DC sources and configured to generate a second AC output voltage, wherein the second DC-AC inverter is configured as a follower unit, the second DC-AC inverter configured to receive the PWM drive signals from the first DC-AC inverter, to drive second power switches of a second power converter subsystem of the second DC-AC inverter.

18. The DC-AC inverter system of claim 17, wherein DC voltage that is input to the first DC-AC inverter from the first DC source and to the second DC-AC inverter from the second DC source is derived from at least one of:
- (i) a photovoltaic solar panel, (ii) a fuel cell, (iii) a battery, (iv) a wind energy generator, or (v) an ultracapacitor.

19. The DC-AC inverter system of claim 17, wherein the first DC-AC inverter and the second DC-AC inverter are each one of:
- (i) a microinverter, (ii) a modular inverter, or (iii) a string inverter.

20. The DC-AC inverter system of claim 17, wherein at least one of the first DC-AC inverter or the second DC-AC inverter further comprises one or more sensors and one or more fault protection features for at least one of:
- input DC voltage high and low limits;
- voltage high and low limits for AC output voltage;
- an output current limit; or
- temperature.

* * * * *